(12) United States Patent
Fechner et al.

(10) Patent No.: US 7,563,737 B2
(45) Date of Patent: *Jul. 21, 2009

(54) CRYSTALLIZATION-STABLE ALUMINO-SILICATE GLASS, ITS MANUFACTURE AND ITS USES

(75) Inventors: Joerg Fechner, Mainz (DE); Franz Ott, Konnersrenth (DE)

(73) Assignee: Schott AG, Mainz (DE)

( * ) Notice: Subject to any disclaimer, the term of this patent is extended or adjusted under 35 U.S.C. 154(b) by 608 days.

This patent is subject to a terminal disclaimer.

(21) Appl. No.: 11/058,591

(22) Filed: Feb. 15, 2005

(65) Prior Publication Data

US 2005/0181926 A1    Aug. 18, 2005

(30) Foreign Application Priority Data

Feb. 16, 2004 (DE) .................. 10 2004 007 436

(51) Int. Cl.
*C03C 3/087* (2006.01)
(52) U.S. Cl. .......................................... 501/70; 501/69
(58) Field of Classification Search ............... 501/70, 501/69
See application file for complete search history.

(56) References Cited

U.S. PATENT DOCUMENTS

| 5,091,345 | A | * | 2/1992 | Becker ........................ 501/14 |
| 5,508,237 | A | | 4/1996 | Moffatt et al. |
| 6,300,264 | B1 | * | 10/2001 | Ohara ........................ 501/64 |
| 6,417,124 | B1 | | 7/2002 | Peuchert et al. |
| 6,992,031 | B2 | * | 1/2006 | Naumann et al. .............. 501/69 |
| 7,137,278 | B2 | * | 11/2006 | Ott et al. .................... 65/134.3 |
| 2003/0196453 | A1 | | 10/2003 | Roth et al. |
| 2004/0018934 | A1 | * | 1/2004 | Ott et al. ....................... 501/66 |
| 2004/0029702 | A1 | * | 2/2004 | Naumann et al. .............. 501/70 |
| 2006/0068982 | A1 | * | 3/2006 | Fechner et al. ................. 501/70 |

FOREIGN PATENT DOCUMENTS

| DE | 100 06 305 A1 | 8/2001 |
| DE | 100 09 425 A1 | 9/2001 |
| EP | 0 672 629 A2 | 9/1995 |
| EP | 0 913 365 A1 | 5/1999 |
| SU | 772977 | 10/1980 |
| WO | WO 02/06172 A1 * | 1/2002 |

* cited by examiner

*Primary Examiner*—Karl E Group
*Assistant Examiner*—Elizabeth A Bolden
(74) *Attorney, Agent, or Firm*—Michael J. Striker

(57) ABSTRACT

The crystallization-stable alumino-silicate glass is free of $B_2O_3$ and contains 50 to 60% by weight, $SiO_2$; 14 to 25% by weight, $Al_2O_3$; 0 to 2% by weight, $P_2O_5$; 0 to 7, % by weight, MgO; 5 to 14% by weight, CaO; 0.1-2.0% by weight, SrO; 12.0 to 18% by weight BaO and at least 0.01% by weight $MoO_3$. The glass preferably contains <0.01 wt. % of water. The glass has high transmission in the visible and IR region of the spectrum, which makes it especially suitable for lamps, bulbs for halogen lamps; and also for solar collectors, for flat display screens and for pharmaceutical packages n which the glass functions as a UV-protective glass.

13 Claims, 1 Drawing Sheet

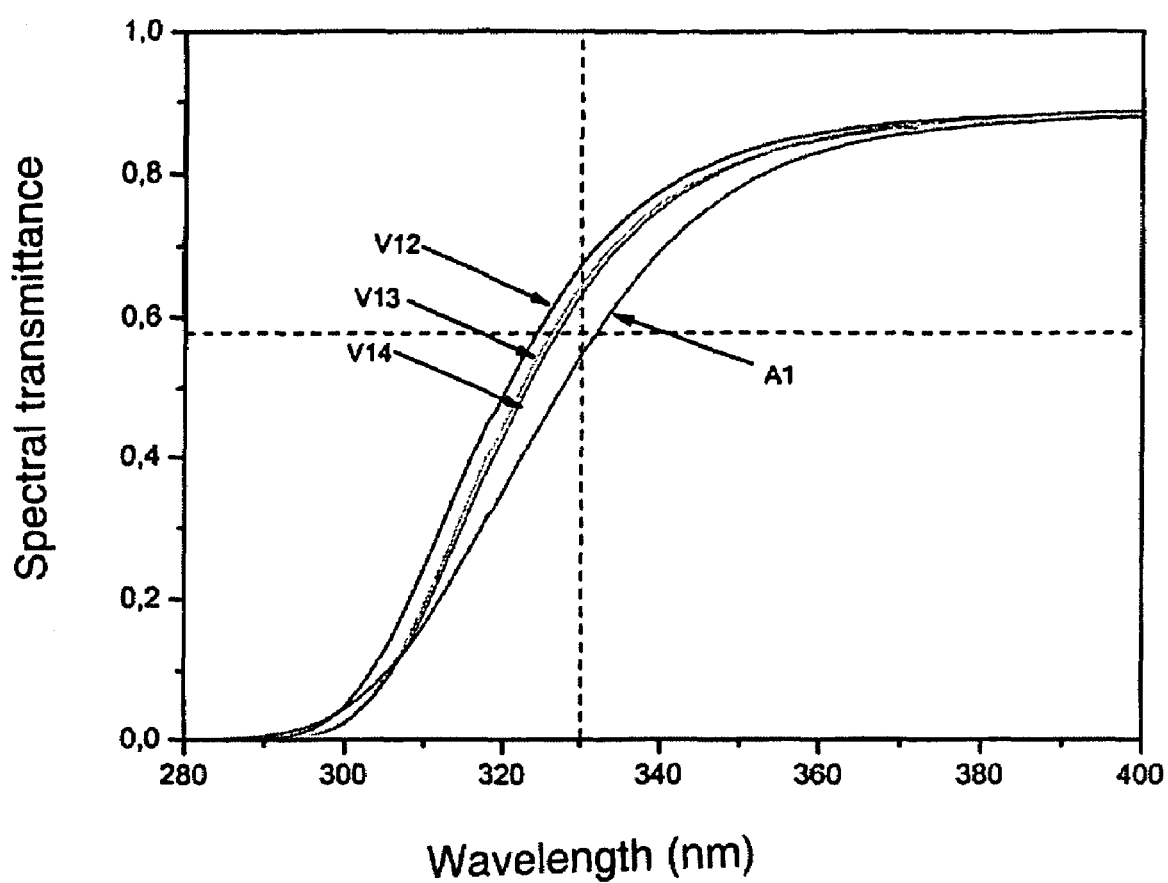

CRYSTALLIZATION-STABLE ALUMINO-SILICATE GLASS, ITS MANUFACTURE AND ITS USES

BACKGROUND OF THE INVENTION

1. Field of the Invention

The invention relates to a crystallization-stable alumino-silicate glass, especially a glass with a sharp UV-edge, a method of making it and to its uses.

2. Related Art

A series of glasses, which can take heavy heat loads and which are used, above all, for lamp bulbs. Especially this sort of glass is used in lamps, which contain molybdenum components, such as electrodes or also conductors. Thus for example EP-A 0 913 365 describes a glass, which can take heavy heat loads, for lamp bulbs, which contains >58 to 62% by weight $SiO_2$; 15 to 17.5% by weight $Al_2O_3$; 0.2 to 0.7% by weight $B_2O_3$; 0 to <1% by weight MgO; 5.5 to 14% by weight CaO; 0 to 8% by weight SrO; 6 to 10% by weight BaO; 0.05 to 1.0% by weight $ZrO_2$; 0 to 0.3% by weight $CeO_2$; 0 to 0.5% by weight $TiO_2$ and 0 to 0.6% by weight $Br^-$. The crystallization stability is improved by addition of MgO, which takes on a similar network forming function like $Al_2O_3$ and $SiO_2$. For this purpose the MgO together with CaO and SrO in the glass should have an exact definite weight relationship to BaO. The alkali content is below 0.03% by weight and the water content is below 0.02% by weight in this sort of glass. To adjust the UV absorption $CeO_2$ and/or $TiO_2$, which shift the absorption to longer wavelengths, are(is) added to this sort of glass.

DE-A 100 06 305 describes another glass, which can take heavy heat loads, or lamp bulbs, which comprises an alkaline earth alumino-silicate glass. The glass described in this reference is characterized by a composition (in % by weight on an oxide basis) of >58 to 62% by weight $SiO_2$; 14 to 16% by weight $Al_2O_3$; 0.2 to 1.0% by weight $B_2O_3$; 0 to <1% by weight MgO; 9 to 13% by weight CaO; 0 to 4% by weight SrO; 10 to 12% by weight BaO; 1 to 1.8% by weight $ZrO_2$; 0 to 0.3% by weight $CeO_2$; 0 to 0.5% by weight $TiO_2$ and 0 to 0.1% by weight Cl. In this glass the ratio of CaO plus SrO to BaO amounts to 0.8 to 1.3. This glass is especially suitable for putting molybdenum components, such as molybdenum wires, through the outer glass bulb. Furthermore the glass is characterized by improved devitrification stability.

EP-A 0 672 629 discloses an alumino-silicate glass for flat display screens, which is essentially free of alkali oxides and which contains 49 to 67% by weight $SiO_2$; 6 to 14% by weight $Al_2O_3$ and 0 to 15% by weight $B_2O_3$ as well as 12 to 13% by weight of alkaline earth oxides. This sort of glass has a thermal expansion coefficient CTE in a range of 31 to $57*10^{-7}/°C$.

However it is has been shown that the glass compositions according to the prior art are generally strongly inclined to crystallize. Thus crystals arise in this sort of glass from the melt vessel and/or settling vessel, especially at the debiteuse and/or the so-called "Danner blowpipe", which grow further with time and which detach in sufficient amounts from their deposit, and thus arrive in the viscous glass. Since this sort of crystal does not dissolve in glass, it remains in the end product as a troublesome or interfering grain-form inclusion.

Furthermore these crystals, which form during drawing at the so-called Danner blowpipe and/or the needle or nozzle and fasten or attach themselves there, lead to striations or streaks on the glass surface. This makes the so-called "rinsing or scavenging" at high temperatures required, in which the crystals are detached or removed. This rinsing or scavenging step requires halting the production of the glass and thus leads to yield reductions.

Furthermore in many applications it is undesirable to provide the glass with a UV absorption cutoff that is as sharp as possible, i.e. a boundary region between those wavelengths, which can pass through the glass with a high transmission, and those wavelengths, which are absorbed, is as small as possible. In other words, in some applications it is undesirable that the so-called UV cutoff is comparatively steep.

SUMMARY OF THE INVENTION

It is an object of the present invention to provide a crystallization-stable alumino-silicate glass of the above-described type that overcomes the above-described problems and disadvantages.

The crystallization-stable alumino-silicate glass according to the invention contains:

| | |
|---|---|
| $SiO_2$ | 50-66% by weight |
| $Al_2O_3$ | 14-25% by weight |
| $B_2O_3$ | 0-<5% by weight |
| $P_2O_5$ | 0-2% by weight |
| MgO | 0-7% by weight |
| CaO | 5-14% by weight |
| SrO | 0-8% by weight |
| BaO | 6-18% by weight |
| $MoO_3$ | at least 0.01% by weight |

It has been shown that surprisingly no or hardly any crystals arise in the glass composition according to the invention and, even if that does happen, only a very small amount of cristobalite forms, which is not troublesome.

This type of crystal detaches immediately from the location where it forms (especially in the Danner blowpipes, the nozzle or the needle). Also primarily crystals arise which are not so-large that they mar the appearance of the glass by forming striations and/or glass defects in the glass.

In contrast it has been found that the glasses described in the prior art exclusively or additionally deposit feldspar crystals (alkaline earth alumino-silicates). It has been shown that these crystalline phases adhere strongly to materials during hot shaping.

Thus these latter crystals grow and lead, in cases in which they detach to defects in glass, besides to striations on the glass surface.

It has now been surprisingly shown that a desired absorption of damaging UV radiation can be achieved by the addition of small amounts of $MoO_3$ to the glass according to the invention.

Especially a suitable UV blocking can be attained in the glass with small amounts of $MoO_3$, i.e. less than half or less than a quarter (in % by weight) of the amount of $TiO_2$ in the corresponding glass described in the prior art. This has a positive effect on the entire glass composition, since the crystallization stability of the base glass composition is hardly affected at all.

Thus the UV cutoff can easily be adjusted to the frequently required specification of a transmission of <65%, preferably 64% or 62% and most preferably <60% and <58%. In a special embodiment the transmission is less than 55% with a layer thickness of 1 mm and a wavelength of 330 nm.

Finally it has been shown that $MoO_3$ assists in the refining of the glass. In the refining it acts as a polyvalent ion similarly like the known refining agents $As_2O_3$ and $Sb_2O_3$.

The glass according to the invention contains molybdenum oxide in an amount of at least 0.01% by weight, especially at least 0.05% by weight. The minimum amount of this ingredient is from 0.1 to 0.2% by weight. Particularly minimum amounts of $MoO_3$ of 0.3% by weight are especially preferred. The upper limit of the amount of $MoO_3$ is variable and depends on the desired UV cutoff and desired refining effect. These minimum amounts of $MoO_3$ however are already sufficient to produce the crystallization stability according to the invention. In a preferred embodiment the upper limit of $MoO_3$ amounts to 4% by weight, but 3% by weight and especially 2% by weight are especially preferred. An especially preferred upper limit amounts to 1.2 or 1% by weight. A maximum content of 0.8% by weight of $MoO_3$ is especially preferred.

$SiO_2$ is preferably contained in an amount of at least 50, preferably at least 55, and especially preferably in an amount of at least 58, % by weight. The upper limit of this ingredient is at most 66% by weight and especially 65% by weight. A maximum content of $SiO_2$ of 64% by weight is especially preferred.

The minimum content of $Al_2O_3$ amounts to at least 14% by weight, but greater than 14% by weight is especially preferred. The upper limit for the $Al_2O_3$ content amounts to 25% by weight, wherein 20 and especially 18 percent by weight are preferred.

$B_2O_3$ is contained in an amount of at most <0.5% by weight, especially less than 0.4% by weight, but a content of <0.2, especially <0.1%, by weight is especially preferred. The glass according to the invention is especially preferably free of $B_2O_3$. The content of $P_2O_5$ amounts to from 0 to 2% by weight, wherein a maximum amount of 1.5% by weight is preferred.

MgO is contained in an amount of 0 to at most 7% by weight, but an upper limit of 2.0, and especially 1.5, % by weight is preferred. An upper limit of 1.2, and especially of 1.0, % by weight is especially preferred, but an upper limit of 0.95% is most preferred. The lower limit for the amount of magnesium amounts preferably to 0.1% by weight, but a minimum amount of 0.2, or especially 0.5, % by weight is especially preferred.

The CaO content amounts to 5 to 14% by weight, wherein an upper limit of usually 12% by weight and especially 11% or 10% by weight is preferred. The lower limit for CaO preferably is greater than 5.5% by weight, but greater than 6% by weight is especially preferred. The content of SrO amounts to from 0 to 8% by weight, preferably from 0.1 to 2.0% by weight.

BaO is contained in the glass according to the invention in an amount of at least 6% by weight and a maximum amount of 18% by weight, but a minimum amount of 8 to 12% by weight is especially preferred. A preferred upper limit for BaO amounts to 17% by weight.

The glass according to the invention contains, if needed, one or more of the following additional ingredients: 0 to 8% by weight $TiO_2$, 0 to 2% by weight of $WO_3$, 0 to 3% by weight $ZrO_2$ and 0 to 1% by weight $CeO_2$. Additives of this sort have proven suitable as additional absorption agents for adjusting the UV cutoff or UV edge.

If additive ingredients of this type are added, it is possible to reduce the amount of $MoO_3$ and indeed usually to 0.1 to 1% by weight, especially to 0.2 to 0.5% by weight.

An entirely special preferred embodiment of the special crystallization-stable glass according to the invention has the following composition:

| | |
|---|---|
| $SiO_2$ | 59-61.5% by weight |
| $Al_2O_3$ | 15.0-16.0% by weight |
| MgO | 0.5-1.0% by weight |
| CaO | 6.0-10.0% by weight |
| SrO | 0.1-2.0% by weight |
| BaO | 12.0-18% by weight |
| $ZrO_2$ | 0-4% by weight |
| $TiO_2$ | 0-2% by weight |
| $MoO_3$ | 0.1-1% by weight |

The UV cutoff can be definitely adjusted or set by means of the addition of $MoO_3$ according to the invention. However by means of the above-described additional additive ingredients the UV cutoff can be even more finely adjusted. It can be shifted in this way by ±20 nm, especially ±10 nm. The glass according to the invention is outstanding in that it has a transmission of greater than 80%, especially >85%, most preferably >88% in the visible range, especially with a layer thickness of 1 mm and a wavelength of 400 to 800 nm. Especially it is also outstanding because it has a high transparency for heat radiation. Thus it especially has no or extraordinarily little absorption in the IR range between 500 and 1500 nm. For this reason it is especially suitable for applications, in which a high permeability for IR radiation is necessary or desirable. Thus the glass has scarcely any or only a slight discoloration in the visible range. In an especially preferred embodiment it contains only small amounts of titanium and iron. The titanium content is between 0.1 and 3% by weight and the iron content is from 0.005 to a maximum of 0.1% by weight. Preferably however it is free of iron and contains at most the usual impurities. Cerium is contained in amounts between 0.005 and 0.1% by weight. Independently of that naturally in individual cases it can be desirable to add iron, especially $Fe^{+3}$ as an additional UV blocker.

In a preferred embodiment the glass according to the invention is alkali-free, i.e. it has a content of alkali metal oxides of <0.5% by weight, especially <0.3% by weight. Especially preferably the glass is free of alkali metals up to unavoidable amounts and/or impurities, i.e. at maximum 100 ppm.

In a further preferred embodiment according to the invention the glass is free of water up to unavoidable amounts. Preferably it has a water content of at maximum <0.03% by weight, especially <0.01% by weight and/or 100 ppm.

Finally the glass is free of tin up to unavoidable amounts of impurities in a preferred embodiment.

Conventional refining agents, such as $As_2O_3$ and $Sb_2O_3$, can be added.

The invention relates also to a method of making the glass according to the invention. In this method a melt is prepared in a known way with the composition according to the appended claims, refined, homogenized and conditioned to remove residual bubbles. The melt itself is made directly from the suitable raw materials or by melting and mixing of suitable glass residues. The glass according to the invention is refinable by all current methods, however refining methods, which are preferred are those that are free of arsenic, antimony and tin. Preferred refining methods include sulfate refining and/or electro-chemical refining, as described for example in DE-A 100 09 425.

The glass compositions according to the invention are characterized by an outstanding crystallization-stability with very good processing properties. The VA (temperature at which the glass has a viscosity of $10^4$ dpas) is decisive for selection of a glass for processing (hot shaping). It should be at comparatively low temperatures. It is also decisive for crystallization-stability in processing that as large a temperature difference as possible exists between VA and OEG (upper devitrification temperature). It is preferred when the OEG is at least 20° under VA, wherein at least 50°, or at least 100° under, is especially preferred. In an entirely especially preferred embodiment the OEG is 120° or 140° under VA. Furthermore glass used for halogen lamp bulbs requires as high as possible a Tg, so that the glass can be kept at the high temperatures, which are present within the lamp without deforming. Preferably these Tg are greater than 700°, especially preferably >750°, entirely preferably greater than 770° or 790°.

The glass according to the invention is suitable for making both flat glass, such as float glass, and also for making lamp tubes and lamp bulbs. The melted and refined glass melt, which is homogenized in a conditioning phase, is drawn by means of a hollow needle arranged preferably in the bottom of a vessel or trough.

The invention also relates to the use of this sort of glass for making lighting devices, especially lamps, preferably halogen lamps, and for making solar collector, display screens, especially flat display screens for computers and TV units, especially for making of so-called "Backlights" for background illumination of the display screens, wherein the glass acts as a UV-protective glass. It is also useful in areas, which require a high permeability for heat, especially IR radiation. An additional usage relates to pharmaceutical packaging.

The following examples serve to illustrate the invention, but their details should not be considered to limit any of the appended claims.

EXAMPLES

Glass compositions according to the invention were made and their compositions are listed in Table I.

The crystallization properties OEG, ° C. (upper devitrification temperature); UEG, ° C. (lower devitrification temperature), Kg max, ° C. and Kg max (µm/min) were determined in a temperature gradient oven after 60 min (Temperature gradient of 900° C. to 1400° C.).

The entry "tempering 115 h/1130° C." in the table designates a long time tempering of the glass in an oven with a constant temperature of 1130° C. for 115 h. The percentage of the glass that is in the crystalline phase is determined by means of X-ray diffraction in this test.

The lines under the heading "% Distribution of the crystalline phase" in the table give the fractions of the different individual types of crystalline phases (e.g. Anorthite) that are present in percent, based on the total amount of the crystalline phases present (=100%).

The lines under the heading "% of total amount" give the percentages of particular individual types of crystalline phases that are present based on the total amount of the entire glass matrix. Here the amount of the amorphous material is also included in the total amount of the glass matrix, i.e. the percentages in these lines are based on, or are percentages of, the total amount of both amorphous and crystalline material: i.e. amorphous phase+crystalline phases=100%.

TABLE I

GLASS COMPOSITIONS OF THE INVENTION AND THEIR PROPERTIES (amounts of ingredients in % by weight)

| Oxide Ingredients/ Properties | A1 | A2 | A3 | A4 | A5 | A6 |
|---|---|---|---|---|---|---|
| $SiO_2$ | 59.90 | 59.40 | 59.50 | 59.40 | 61.20 | 60.2 |
| $Al_2O_3$ | 15.60 | 15.80 | 15.80 | 15.50 | 10.00 | 15.6 |
| $B_2O_3$ | — | — | — | — | — | — |
| MgO | 0.70 | 0.70 | 0.70 | 0.60 | 0.90 | 0.9 |
| CaO | 9.80 | 9.80 | 9.60 | 9.80 | 6.10 | 9.8 |
| SrO | 0.20 | 0.20 | 0.20 | 0.20 | 1.40 | 0.2 |
| BaO | 13.30 | 13.30 | 13.30 | 13.30 | 17.00 | 13.28 |
| $ZrO_2$ | — | — | — | — | 3.00 | — |
| $TiO_2$ | | | 0.50 | 1.00 | — | — |
| $MoO_3$ | 0.50 | 0.80 | 0.40 | 0.20 | 0.40 | 0.02 |
| $Fe_2O_3$ | | | | | | |
| Total | 100.00 | 100.00 | 100.00 | 100.00 | 100.00 | 100.00 |
| ALPHA × $10^6$ in $K^{-1}$ (20-300° C.) | 4.62 | | | | 4.64 | 4.59 |
| Tg, ° C. | 795 | | | | 780 | 782 |
| VA, ° C. | 1332 | | | | 1355 | 1335 |
| OEG, ° C. | 1185 | | | | 1225.0 | |
| UEG, ° C. | <1105 | | | | <1140 | |
| KG max, ° C. | 1160 | | | | 1185.0 | |
| KG max, µm/min | 0.2 | | | | 0.10 | |
| Tempering 115 h/1130° C. % Distribution of the crystalline phase | | | | | | |
| Cristobalite $SiO_2$ | 100 | 100 | 100 | 100 | 100 | |
| Ba.Sr, feldspar (mkl) | — | — | — | — | — | |
| Celsian, $BaAl_2SiO_8$ | — | — | — | — | — | |
| Zircon $ZrSiO_4$ | — | — | — | — | — | |
| Baddeleyite $ZrO_2$ (mkl) | — | — | — | — | — | |
| Anorthite $CaAl_2Si_2O_8$ | — | — | — | — | — | |

TABLE I-continued

GLASS COMPOSITIONS OF THE INVENTION AND THEIR PROPERTIES (amounts of ingredients in % by weight)

| Oxide Ingredients/ Properties | A1 | A2 | A3 | A4 | A5 | A6 |
|---|---|---|---|---|---|---|
| % total amount | | | | | | |
| Cristobalite | 0.2 | | | | <1.0 | |
| Feldspar | | | | | | |
| Amorphous phase | 99.8 | | | | >99.0 | |
| Transmission, % at 330 nm (d = 1.0 mm) | 54.50 | 48.30 | | | | |

Comparative glass compositions V1 to V11 of the prior art (in contrast the exemplary glass compositions according to the invention) and their properties are listed in the following table II. A feldspar crystalline phase (alkaline earth aluminosilicate) forms in these comparative examples. This is disadvantageous since this crystalline phase can grow and adhere to materials during hot shaping and thus leads to glass defects.

TABLE II

COMPARATIVE GLASS COMPOSITIONS AND THEIR PROPERTIES (amounts of ingredients in % by weight)

| Oxide Ingredients/ Properties | V1 | V2 | V3 | V4 | V5 |
|---|---|---|---|---|---|
| $SiO_2$ | 60.85 | 56.50 | 56.20 | 56.90 | 57.00 |
| $Al_2O_3$ | 16.50 | 15.90 | 15.60 | 15.80 | 12.10 |
| $B_2O_3$ | 0.30 | 0.90 | 0.40 | | 0.40 |
| MgO | 0.00 | 1.00 | 1.50 | 1.80 | 2.20 |
| CaO | 13.50 | 7.40 | 5.90 | 7.60 | 6.60 |
| SrO | 0.00 | 4.50 | 4.00 | | |
| BaO | 7.85 | 11.50 | 14.90 | 17.10 | 17.10 |
| $ZrO_2$ | 1.00 | 2.30 | 1.50 | 0.90 | 4.60 |
| $TiO_2$ | | | | | |
| $MoO_3$ | | | | | |
| $Fe_2O_3$ | 0.02 | 0.02 | 0.02 | 0.02 | 0.02 |
| Total | 100.00 | 100.00 | 100.00 | 100.00 | 100.00 |
| ALPHA × $10^6$ in $K^{-1}$ (20-300° C.) | 4.74 | 4.70 | 4.80 | 4.79 | 4.75 |
| Tg, ° C. | 787 | 778 | 788 | 783 | 788 |
| VA, ° C. | 1306 | 1300 | 1317 | 1311 | 1298 |
| OEG, ° C. | 1230 | 1245 | 1290 | 1300 | 1360 |
| UEG, ° C. | 1060 | 1040 | 1060 | 1060 | 1100 |
| KG max, ° C. | 1140 | 1150 | 1230 | 1220 | 1230 |
| KG max, μm/min | 0.20 | 0.54 | 0.27 | 0.20 | 0.07 |
| Tempering 115 h/1130° C. % Distribution of the crystalline phase | | | | | |
| Cristobalite $SiO_2$ | 43 | 17 | 27 | 26 | 34 |
| Ba.Sr, feldspar (mkl) | — | 83 | 73 | 67 | 48 |
| Celsian, $BaAl_2SiO_8$ | — | — | — | 7 | 6 |
| Zircon $ZrSiO_4$ | — | — | — | — | 8 |
| Baddeleyite $ZrO_2$ (mkl) | — | — | — | — | 4 |
| Anorthite $CaAl_2Si_2O_8$ | 57 | — | — | — | — |
| % total amount | | | | | |
| Cristobalite | | | | | |
| Feldspar | | | | | |
| Amorphous phase | | | | | |
| Transmission, % at 330 nm (d = 1.0 mm) | | | | | |

| Oxide Ingredients/ Properties | V6 | V7 | V8 | V9 | V10 | V11 |
|---|---|---|---|---|---|---|
| $SiO_2$ | 59.60 | 55.20 | 57.30 | 58.10 | 57.60 | 60.79 |
| $Al_2O_3$ | 15.20 | 17.70 | 16.40 | 16.40 | 16.40 | 16.52 |
| $B_2O_3$ | 0.80 | 0.90 | | | | 0.30 |
| MgO | 0.40 | 0.80 | 1.20 | 1.00 | 1.00 | 0.00 |
| CaO | 8.40 | 8.60 | 9.60 | 10.50 | 10.50 | 13.52 |
| SrO | 3.00 | 2.20 | 1.50 | 1.00 | 1.00 | 0.00 |

TABLE II-continued

COMPARATIVE GLASS COMPOSITIONS AND THEIR PROPERTIES
(amounts of ingredients in % by weight)

| | | | | | | |
|---|---|---|---|---|---|---|
| BaO | 11.30 | 12.90 | 12.20 | 11.60 | 11.60 | 7.86 |
| $ZrO_2$ | 1.30 | 1.70 | 1.80 | 1.40 | 1.40 | 1.00 |
| $TiO_2$ | — | — | — | — | 0.50 | — |
| $MoO_3$ | — | — | — | — | — | — |
| $Fe_2O_3$ | 0.02 | 0.02 | 0.02 | 0.02 | 0.02 | |
| Total | 100.00 | 100.00 | 100.00 | 100.00 | 100.00 | |
| ALPHA × $10^6$ in $K^{-1}$ (20-300° C.) | 4.58 | 4.72 | 4.73 | 4.79 | 4.68 | 4.58 |
| Tg, ° C. | 777 | 789-787 | 791-788 | 792 | 782 | 789 |
| VA, ° C. | 1326 | 1298-1304 | 1288-1305 | 1302 | 1301 | 1307 |
| OEG, ° C. | 1250 | 1290 | 1245 | 1210 | | 1300 |
| UEG, ° C. | 1100 | <1130 | <1125 | <1130 | | 1105 |
| KG max, ° C. | 1170 | 1150-1210 | 1165-1185 | 1155 | | |
| KG max, μm/min | 0.09 | 0.06-0.4 | 0.1-0.3 | 0.10 | | |
| Tempering 115 h/1130° C. % Distribution of the crystalline phase | | | | | | |
| Cristobalite $SiO_2$ | 42 | 1 | 1 | 1 | | |
| Ba.Sr, feldspar (mkl) | 58 | 1 | 1 | 1 | | |
| Celsian, $BaAl_2SiO_8$ | — | 42 | 44 | 20 | | |
| Zircon $ZrSiO_4$ | — | — | — | — | | |
| Baddeleyite $ZrO_2$ (mkl) | — | — | — | — | | |
| Anorthite $CaAl_2Si_2O_8$ % total amount | — | 56 | 54 | 78 | — | |
| Cristobalite | | | | | | 2.0 |
| Feldspar | | | | | 6.0 | 10.0 |
| Amorphous phase | | | | | 94.0 | 88.0 |
| Transmission, % at 330 nm (d = 1.0 mm) | | | | | | |

The comparative examples in the following portion of table II include the especially useful transmission data in relation to the $TiO_2$ content for adjusting the UV edge.

TABLE II

(con). COMPARATIVE GLASS COMPOSITIONS AND THEIR PROPERTIES (amounts of ingredients in % by weight)

| Oxide Ingredients/ Properties | V12 | V13 | V14 |
|---|---|---|---|
| $SiO_2$ | 58.75 | 58.70 | 58.90 |
| $Al_2O_3$ | 15.60 | 15.60 | 15.60 |
| $B_2O_3$ | 0.20 | — | — |
| MgO | 0.90 | 0.90 | 0.70 |
| CaO | 9.80 | 9.80 | 9.80 |
| SrO | 0.20 | 0.20 | 0.20 |
| BaO | 13.30 | 13.30 | 13.30 |
| $ZrO_2$ | | | |
| $TiO_2$ | 1.25 | 1.50 | 1.50 |
| $MoO_3$ | | | |
| $Fe_2O_3$ | 0.02 | 0.02 | 0.02 |
| Total | 100.00 | 100.00 | 100.00 |
| ALPHA × $10^6$ in $K^{-1}$ (20-300° C.) | 4.68 | 4.66 | 4.64 |
| Tg, ° C. | 779 | 789 | 781 |
| VA, ° C. | 1306 | 1306 | 1315 |
| OEG, ° C. | | | 1235 |
| UEG, ° C. | | | <1115 |
| KG max, ° C. | | | |
| KG max, μm/min | n.b. | n.b. | n.b. |
| Tempering 115 h/1130° C. % Distribution of the crystalline phase | | | |
| Cristobalite $SiO_2$ | | | |
| Ba.Sr, feldspar (mkl) | | | |
| Celsian, $BaAl_2SiO_8$ | | | |
| Zircon $ZrSiO_4$ | | | |
| Baddeleyite $ZrO_2$ (mkl) | | | |
| Anorthite $CaAl_2Si_2O_8$ % total amount | | | |
| Cristobalite | | | |
| Feldspar | | | |
| Amorphous phase | | | |
| Transmission, % at 330 nm (d = 1.0 mm) | 67.10 | 63.10 | 64.40 |

The UV-blocking action of about 54% to 58% cannot be achieved by comparative glass compositions V12 to V14, which contain an amount of $TiO_2$, which is 2 to 3 times greater that the corresponding $MoO_3$ content in exemplary glass composition A1 according to the invention.

The glass compositions according to the invention are characterized by a transmission of less than 55% at a wavelength of 330 nm for a thickness of 1 mm. They clearly outperforms the maximum required transparency in many cases, as can be seen from the accompanying figure.

BRIEF DESCRIPTION OF THE DRAWING

The appended FIG. 1 is a graphical illustration showing the spectral transmission of the exemplary glass A1 according to the invention and comparative examples V12, V13 and V14 versus wavelengths in the ultraviolet range around 330 nm.

The disclosure in German Patent Application 10 2004 007 436.4 of Feb. 16, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a crystallization-stable alumino-silicate glass, its manufacture and its uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A crystallization-stable alumino-silicate glass, which is free of $B_2O_3$ and contains:

| | |
|---|---|
| $SiO_2$ | 50-66% by weight |
| $Al_2O_3$ | 14-25% by weight |
| $P_2O_5$ | 0-2% by weight |
| MgO | 0-7% by weight |
| CaO | 5-14% by weight |
| SrO | 0.1-2.0% by weight |
| BaO | 12.0-18% by weight |
| $MoO_3$ | at least 0.01% by weight. |

2. The glass as defined in claim 1, containing from 0.3 to 4 percent by weight of said $MoO_3$.

3. The glass as defined in claim 1, further comprising $Sb_2O_3$ and $As_2O_3$ in an amount of at most 1 percent by weight.

4. The glass as defined in claim 1, containing 0 to 8 percent by weight of $TiO_2$, 0.01 to 2 percent by weight of said $MoO_3$, 0 to 3 percent by weight of $ZrO_2$ and/or 0 to 1 percent by weight $CeO_2$.

5. The glass as defined in claim 1, containing 0 to 1 percent by weight of chlorine and/or 0 to 3 percent by weight of $SO_3$.

6. The glass as defined in claim 1, having a total content of alkali oxides less than 0.5 percent by weight.

7. The glass as defined in claim 1, obtained by a method comprising refining with $MoO_3$, sulfate and/or refining by electrochemical refining.

8. The glass as defined in claim 1, having a transmission in a visible range of greater than 88% for a cilass sample with a thickness of 1 mm and at wave lengths of 400 to 800 nm.

9. The glass as defined in claim 1, having a transmission of less than 58% at 330 nm.

10. A glass-containing article comprising a crystallization-stable alumino-silicate glass as defined in claim 1, wherein the glass-containing article is a lighting device or a bulb for a halogen lamp.

11. A glass-containing article comprising a crystallization-stable alumino-silicate glass as defined in claim 1, wherein the glass-containing article is solar collector, a flat display screen or a pharmaceutical package in which the alumino-silicate glass acts as a UV-protective glass.

12. A crystallization-stable alumino-silicate glass, which is free of $B_2O_3$ and contains:

| | |
|---|---|
| $SiO_2$ | 59-61.5% by weight |
| $SiO_2$ | 14-25% by weight |
| $Al_2O_3$ | 0-<5% by weight |
| MgO | 0-2% by weight |
| CaO | 6.0-10.0% by weight |
| SrO | 0.1-2.0% by weight |
| BaO | 12.0-18% by weight |
| $ZrO_2$ | 0-4% by weight |
| $TiO_2$ | 0-2% by weight |
| $MoO_3$ | 0.1-1% by weight; and | contains less than 100 ppm of water and thus absorbs substantially no infrared radiation with wavelengths between 500 nm and 1500 nm.

13. The glass as defined in claim 12, which contains from 0 to 0.5% by weight of said $TiO_2$ and from 0.4 to 1 wt. % of said $MoO_3$.

* * * * *